United States Defensive Publication [19] (H) [11] T107,801

Nersasian [43] May 5, 1987

[54] PROCESS FOR RAPIDLY CURING A BROMINATED FLUOROELASTOMER

[76] Inventor: Arthur Nersasian, 335 Spalding Rd., Wilmington, Del. 19803

[21] Appl. No.: 658,795

[22] Filed: Oct. 9, 1984

Related U.S. Application Data

[63] Continuation of Ser. No. 539,732, Oct. 6, 1983.

[51] Int. Cl.[4] ..... C08F 114/18

[52] U.S. Cl. ..... 525/326.3; 525/368; 525/369; 525/387; 525/375; 528/392; 568/682; 526/249; 570/137

[57] ABSTRACT

A process for rapidly curing a fluoroelastomer which comprises mixing and heating a fluoroelastomer copolymer whose interpolymerized units consist essentially of vinylidene fluoride, at least one other fluorine-containing monomer copolymerizable therewith, said monomer being a compound which contains 2–7 carbon atoms, contains no bromine, and contains at least as many fluorine atoms as carbon atoms and contains up to 3 mole percent of units derived from a bromine-containing olefin; a quaternary phosphonium compound; a bisphenol or an ammonium or phosphonium salt thereof; and a dialkylaminopyridine or a diazabicyclo compound having the formula

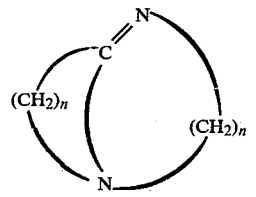

or

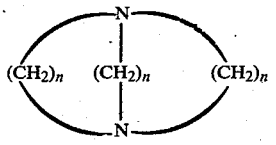

where n is 2–8 or 0.2–0.8 parts by weight per hundred parts fluoroelastomer of a carboxylic acid salt of (a) or (b).

9 Claims, No Sheets Drawing,

25 Pages Specification

The file of this unexamined application may be inspected and copies thereof may be purchased (849 O.G. 1221, Apr. 9, 1968).